United States Patent [19]
Otaki et al.

[11] Patent Number: 5,908,676
[45] Date of Patent: Jun. 1, 1999

[54] OXYGEN ABSORBING RESIN, DEOXIDIZING MULTI-LAYER STRUCTURE USING RESIN, AND PACKAGING CONTAINER

[75] Inventors: Ryoji Otaki; Takashi Kashiba; Yoshiki Ito, all of Kanagawa-ken, Japan

[73] Assignee: Mitsubishi Gas Chemical Company, Inc., Tokyo, Japan

[21] Appl. No.: 08/885,569

[22] Filed: Jun. 30, 1997

[30] Foreign Application Priority Data

Jul. 12, 1996 [JP] Japan ................................. 8-183698

[51] Int. Cl.$^6$ ........................................ B29D 22/00
[52] U.S. Cl. ..................... 428/35.4; 428/36.6; 428/36.7; 428/500; 428/688; 428/689; 524/261; 524/313; 524/435; 524/437; 525/95; 525/98
[58] Field of Search ................................. 524/261, 313, 524/435, 437; 525/95, 98; 428/36.6, 36.7, 500, 688, 689, 35.4

[56] References Cited

FOREIGN PATENT DOCUMENTS

| | | |
|---|---|---|
| 0 413 105 A2 | 2/1991 | European Pat. Off. . |
| 0 688 666 A1 | 12/1995 | European Pat. Off. . |
| 0 781 650 A1 | 7/1997 | European Pat. Off. . |

OTHER PUBLICATIONS

Database WPI, Week 8329, Derwent Publications Ltd., London, GB, AN 83–713398 of JP 58 096 550, Jun. 8, 1983.

*Primary Examiner*—Jose' G. Dees
*Assistant Examiner*—Michael A. Williamson
*Attorney, Agent, or Firm*—Frishauf, Holtz, Goodman, Langer & Chick, P.C.

[57] ABSTRACT

An oxygen absorbing resin in which a deoxidizing composition is dispersed in a thermo-plastic resin mixture comprising (A) a thermoplastic elastomer and/or an ethylene propylene copolymer and (B) a thermo-plastic resin other than the above-mentioned (A), and having a flexural modulus of 600 MPa or less and an oxygen permeability of 130 cc.mm/m$^2$.atm.day (23° C., 50% RH) or more. The oxygen absorbing resin has an oxygen absorbing performance equal to that of a conventional deoxidizing agent in a small bag. A deoxidizing multi-layer structure which comprises a layer (I) comprising a thermoplastic resin layer having an oxygen permeability of 800 cc/m$^2$.atm.day (23° C., 50% RH) or more, a layer (II) comprising the oxygen absorbing resin, and a layer (III) having gas barrier properties. In addition, the deoxidizing multi-layer structure has a function of positively and efficiently absorbing oxygen.

21 Claims, 1 Drawing Sheet

OXYGEN ABSORBING RESIN, DEOXIDIZING MULTI-LAYER STRUCTURE USING RESIN, AND PACKAGING CONTAINER

BACKGROUND OF THE INVENTION (i) Field of the Invention

The present invention relates to an oxygen absorbing resin, a deoxidizing multi-layer structure using this resin, and a packaging containers This oxygen absorbing resin can be obtained by dispersing a deoxidizing composition in a resin having flexibility and a high oxygen permeability, and in addition, the oxygen absorbing resin has an oxygen absorbing velocity equal to that of a deoxidizing agent received in a small bag (hereinafter referred to as "the deoxidizing agent in the small bag" on occasion) and a higher oxygen absorbing ability as compared with a conventional oxygen absorbing resin. Furthermore, the deoxidizing multi-layer structure using this oxygen absorbing resin is excellent in the oxygen absorption ability and is also moldable. Moreover, the packaging container of the present invention can be utilized to receive drinks, foods, medicines and the like which are easily affected by oxygen, and this packaging container can shut off external oxygen and can remove oxygen present within the container itself in a short period of time without previously purging the container with an inert gas or the like, whereby the spoilage of the packed material can be prevented and hence its long-term preservation is possible.

(ii) Description of the Related Art

Heretofore, as a technique of removing oxygen from packages receiving packed materials such as foods and medicines to prevent the oxidation deterioration, the color change and the like of the packed materials, the spoilage of the packed materials by mold and aerobic bacteria, and the damage of the packed materials by worms, a way of putting a deoxidizing agent together with the material to be packed in each gas barrier bag and then sealing the bag has widely been carried out. As this way, there has usually been used the deoxidizing agent in which a powdery or a particulate deoxidizing composition is filled in a small bag having ventilation properties. However, when this deoxidizing agent in the small bag is mixed with the material to be preserved, the deoxidizing agent might be cooked together with the material to be preserved and then eaten, or the mixed deoxidizing agent might give an alien feeling or a resistant feeling to a user. In addition, the small bag might be mistakenly handled to tear the same, and at this time, the scattered deoxidizing composition might contaminate the material to be preserved. Accordingly, as a deoxidizing package technique not having the above-mentioned problems, it has been contrived in recent years to impart a deoxidizing ability to the packages themselves.

As such examples, for instance, as disclosed in Japanese Patent Publication No. 1824/1987 and Japanese Patent Application Laid-open Nos. 146651/1982, 45152/1992, 90848/1992 and 309323/1995, there are films and sheets of a multi-layer structure having a layer in which the deoxidizing composition is dispersed in a resin. In addition, Japanese Patent Publication No. 60826/1992 has disclosed a packaging container in which the commercially available deoxidizing composition is contained in a gas barrier thermoplastic resin. Furthermore, in Japanese Patent Publication No. 62858/1992, there has been disclosed a container containing a material which can express an oxygen capturing function only at a high temperature and under a high water vapor pressure in a retort treatment. Japanese Patent Publication Nos. 60826/1992 and 62858/1992 have disclosed a technique in which the deterioration of the oxygen barrier properties of a gas barrier resin in the retort treatment is restrained to prevent oxygen from getting into the container.

However, in the packaging container to which an oxygen absorbing performance is imparted, the deoxidizing composition is dispersed in the resin, and therefore the characteristics of the resin have a large influence on the oxygen absorbing velocity and the maximum oxygen absorption of the deoxidizing composition. In the conventional packaging container to which the oxygen absorbing performance is imparted, oxygen penetrated through the resin is absorbed by the deoxidizing composition. Therefore, the oxygen absorbing performance of this packaging container is much lower as compared with the conventional technique using the deoxidizing agent in the small bag, and so there has been a problem that oxygen present in the packaging container cannot be efficiently removed in a short period of time. For the purpose of overcoming such a drawback, for example, there has been used, together with the above manner, a technique in which air of the space in the package is replaced with an inert gas prior to packing the packaging container having the oxygen absorbing performance with the material to be preserved so as to previously decrease an oxygen concentration. For the replacement with the inert gas, however, specific facilities are required, which leads to the increase of a cost. Thus, the above-mentioned problem has not always fundamentally been solved.

In view of the above-mentioned conventional techniques, the present inventors have intensively researched with the intention of improving the deoxidizing performance of the oxygen absorbing resin in which the deoxidizing composition is dispersed. As a result, it has been found that an oxygen absorbing resin obtained by dispersing the deoxidizing composition in a thermoplastic resin mixture containing a thermoplastic elastomer and an ethylene propylene copolymer and having flexibility and a high oxygen permeability constant has a much higher oxygen absorbing velocity as compared with the conventional oxygen absorbing resin and a maximum oxygen absorption several times as much as that of the conventional oxygen absorbing resin. In addition, it has also been found that a deoxidizing multi-layer structure obtained by laminating a layer comprising a thermoplastic resin having a high oxygen permeability, a layer comprising the above-mentioned oxygen absorbing resin and a gas barrier layer, and a packaging container obtained by molding this deoxidizing multi-layer structure can exert the practical oxygen absorbing performance equal to that of the deoxidizing agent in the small bag. The present invention has been completed on the basis of the found knowledge.

SUMMARY OF THE INVENTION

An object of the present invention is to provide an oxygen absorbing resin having a much higher oxygen absorbing velocity as compared with a conventional oxygen absorbing resin and an oxygen absorbing performance several times as much as that of the conventional oxygen absorbing resin.

Another object of the present invention is to provide a deoxidizing multi-layer structure and a packaging container having a performance equal to that of a conventional deoxidizing agent in a small bag and a function of positively and efficiently absorbing oxygen.

That is to say, the first aspect of the present invention is directed to an oxygen absorbing resin in which a deoxidizing composition is dispersed in a thermoplastic resin mixture comprising (A) at least one of a thermoplastic elastomer and an ethylene propylene copolymer and (B) a thermoplastic resin other than the above-mentioned (A), and having a flexural modulus of 600 MPa or less and an oxygen permeability constant of 130 cc.mm/m$^2$.atm.day [23° C., 50% RH (relative humidity)] or more.

The second aspect of the present invention is directed to a deoxidizing multi-layer structure which comprises a layer (I) comprising a thermoplastic resin layer having an oxygen permeability of 800 cc/m².atm.day (23° C., 50% RH) or more, a layer (II) comprising the above-mentioned oxygen absorbing resin, and a layer (III) having gas barrier properties.

The third aspect of the present invention is directed to a packaging container which at least partially comprises the above-mentioned deoxidizing multi-layer structure and which has the above-mentioned layer (I) as an inner layer.

Figure 1:
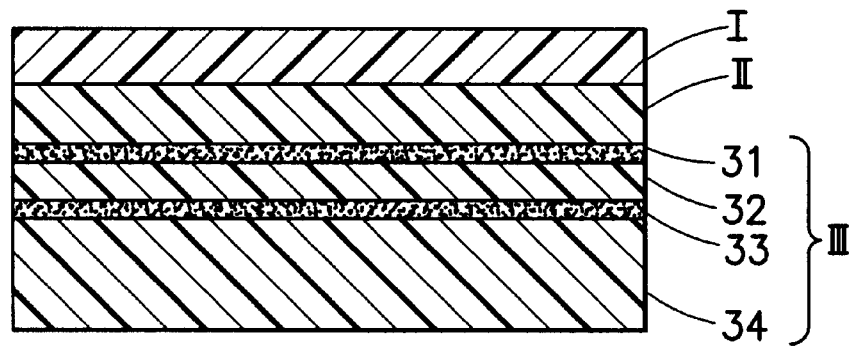
FIG. 1 is a sectional view of one embodiment of a deoxidizing multi-layer structure regarding the present invention.

In these drawings, a layer (I) is an oxygen-permeable isolated layer, and a layer (II) is an oxygen absorbing resin layers and a layer (III) is a gas barrier layer. Furthermore, a layer 31 is an adhesive layer, a layer 32 is a gas barrier resin layer, a layer 33 is an adhesive layer, and a layer 34 is a thermoplastic resin layer.

Reference numeral 1 is a tray-like container comprising the deoxidizing multi-layer structure regarding the present invention.

Numeral 2 is a top film comprising the deoxidizing multi-layer structure regarding the present invention.

3 is a gas barrier tray-like container.

4 is a food.

DESCRIPTION OF PREFERRED EMBODIMENTS OF THE INVENTION

An oxygen absorbing resin of the present invention can be obtained by dispersing a deoxidizing composition in a thermoplastic resin mixture having flexibility and a high oxygen permeability, and this oxygen absorbing resin has an excellent oxygen absorbing performance. The thermoplastic resin mixture constituting the oxygen absorbing resin comprises (A) a thermoplastic elastomer and/or an ethylene propylene copolymer and (B) a thermoplastic resin other than the above-mentioned (A). This thermoplastic resin mixture is required to have a flexural modulus of 600 MPa or less and an oxygen permeability constant of 130 cc.mm/m².atm.day (23° C., 50% RH) or more, and it is more preferable that the flexural modulus is 500 MPa or less and the oxygen permeability constant is 140 cc.mm/m².atm.day (23° C., 50% RH) or more. The deoxidizing composition can be dispersed in and blended with the thermoplastic resin mixture having such physical properties, whereby the practical oxygen absorbing velocity equal to that of a deoxidizing agent contained in a small bag can be exerted, and a higher oxygen absorption ability can be exerted as compared with a conventional oxygen absorbing resin. In this connection, the flexural modulus of the thermoplastic resin mixture which can be used in the present invention means a flexural modulus measured in accordance with JIS K7203. Furthermore, the oxygen permeability constant can be measured by the following procedures First, a bag having a surface area of 400 cm² is made of a film of the thermoplastic resin mixture having a thickness of 100 μm, and the bag is then purged with a nitrogen gas. Afterward, the bag is allowed to stand at 23° C. and 50% RH for 4 hours, and an oxygen concentration in the bag is then analyzed by gas chromatography. Next, the oxygen permeability constant can be calculated on the basis of the oxygen concentration.

Examples of the thermoplastic elastomer which can be used in the present invention include various kinds of elastomers, but styrenic elastomers and olefinic elastomers are preferable. Here, the styrenic elastomer comprises a polystyrene which is a hard segment capable of expressing thermoplastic properties, and a polybutadiene, a polyisoprene or a polyolefin which is a soft segment capable of expressing a rubber elasticity, or it comprises an elastomer obtained by hydrogenating them Typical examples of the styrenic elastomer include Toughplen and Toughtec (trade names, made by Asahi Chemical Industry Co., Ltd), Dynalon (trade name, made by Japan Synthetic Rubber Co., Ltd.), and Rubalon (trade name, made by Mitsubishi Chemical Industries, Ltd.). The olefinic elastomer is a blend of a polyolefin such as polypropylene or polyethylene capable of expressing thermoplastic properties and an elastomer such as an ethylene propylene rubber, a blend partially crosslinked, or a blend completely crosslinked by a dynamic vulcanization. Typical examples of the olefinic elastomer include Sumitomo TPE (trade name, made by Sumitomo Chemical CO., Ltd.), Daipla MK-Resin (trade name, made by Dainippon Plastic Co., Ltd.) and Thermolan (trade name, made by Mitsubishi Chemical Industries, Ltd.). Examples of the ethylene propylene copolymer include amorphous and low-crystalline ethylene-α-olefin copolymers and propylene-α-olefin copolymers which have the rubber elasticity. A typical example of the ethylene propylene copolymer is Toughmer (trade name, made by Mitsui Petrochemical Industries, Ltd.).

In the present invention, as the component (A) of the thermoplastic resin mixture, either of the thermoplastic elastomer and the ethylene propylene copolymer may be used. However, at the time of its use, an odor is generated from the oxygen absorbing resin on occasion. In this case, the thermoplastic elastomer which has a high thermal stability at the time of work and in which unsaturated bonds are hydrogenated, or the ethylene propylene copolymer is preferably used.

Furthermore, the thermoplastic elastomer or the ethylene propylene copolymer preferably has a hardness of 95 or less, more preferably 90 or less. Incidentally, the hardness of the thermoplastic elastomer or the ethylene propylene copolymer means a hardness measured in accordance with the procedure of JIS K6301. If the hardness of the thermoplastic elastomer or the ethylene propylene copolymer is more than 95, a mixed resin of such a thermoplastic elastomer or ethylene propylene copolymer and an polyolefin or the like cannot obtain a desired flexural modulus and oxygen permeability constant on occasion.

On the other hand, no particular restriction is put on the thermoplastic resin which is the component (B) to be mixed with the component (A), any thermoplastic resin is acceptable, so long as it is different from the component (A) in its kind. Usual examples of the thermoplastic resin include polyolefins such as polyethylene, polypropylene and polymethylpentene, modified polyolefins thereof, polystyrene, graft polymers with silicone resins, polyesters such as polyethylene terephthalate, and polyamides such as nylon 6 and nylon 66. These thermoplastic resins may be used singly or in a combination of two or more thereof. Polyolefins such as polyethylene and polypropylene can preferably be used, because of a good compatibility with the thermoplastic elastomer or the ethylene propylene copolymer.

No particular restriction is put on a mixing ratio between the component (A) and the component (B) in the thermoplastic resin mixture of the present invention, and so the mixing ratio may be suitably selected in compliance with given circumstances, but the ratio of the thermoplastic elastomer or the ethylene propylene copolymer which is the component (A) in the thermoplastic resin mixture is preferably in the range of 10 to 80% by weights more preferably 10 to 70% by weight. If the ratio of the component (A) is less than 10% by weight, the improvement effect of the oxygen absorbing performance is insufficient. On the other hands if it is more than 80% by weights the extrusion properties of the resin mixture are often poor, so that it is difficult to prepare a multi-layer structure having a good appearance.

Furthermore, as the deoxidizing composition which is dispersed in this thermoplastic resin mixtures there can be used the so-called water-dependent type deoxidizing composition in the form of particles which gives rise to a deoxidizing reaction when water is fed to the deoxidizing composition. The particulate deoxidizing composition which can suitably be used in the present invention can be prepared as follows. Firsts a particulate reducing material which is the main agent of the deoxidizing reaction is selected, and the selected particulate main agent is then coated with a deoxidizing composition such as a catalyst or a promotor other than the main agent, or the reducing material which is the main agent is mixed with all of the deoxidizing composition and the mixture is then granulated to obtain the particulate deoxidizing composition.

In the deoxidizing compositions examples of the reducing material which is the main agent include metallic powders such as an iron powder, an aluminum powder and a silicon powder, inorganic salts such as ferrous salts and dithionites, and organic substances such as catechol and glycerin. The deoxidizing composition in which the metallic powder is the main agent is particularly preferable and for example, there can suitably be used the deoxidizing composition in which a metal halide is deposited on the surface of the metallic powder and which can be prepared by a method disclosed in Japanese Patent No. 1088514, or the deoxidizing composition obtained by granulating a mixture of the metallic powder, the metal halide and, if necessary, another additive as a binder.

In the deoxidizing composition in which the main agent is the metallic powder, the iron powder is preferable as the metallic powder. No particular restriction is put on the purity of the iron powder, and a part of the iron powder may be oxidized and it may be an alloy with another metal, so long as it can give rise to the oxygen absorbing reaction and can easily be dispersed in the thermoplastic resin mixture. Suitable examples of the metallic powder include iron powders such as a reduced iron powder, a sprayed iron powder and an electrolyzed iron powder, an iron powder scattered during the manufacture of cast iron, and fine particles and fibrous pieces formed during grinding and polishing of various iron products such as the cast iron and steel materials. Moreover, the particle size of the particulate metallic iron is preferably as small as possible. This reason is that, in consideration of a fact that the oxygen absorbing resin, when used, is molded into the form of a layer and this layer is then laminated with other layers, it is desirable that the layer is thinned and its surface is smoothed. From such a viewpoint, the average particle diameter of the particulate metallic iron is preferably 50 µm or less. Also in the case of the fibrous metallic iron, its diameter and length are preferably as small as possible for the same reason.

The metal halide catalytically functions in the oxygen absorbing reaction of the metallic iron in the thermoplastic resin mixture. The metal of the metal halide is at least one selected from the group consisting of alkali metals, alkaline earth metals, copper, zinc, aluminum, tin, iron, cobalt and nickel. In particular, lithium, potassium, sodium, magnesium, calcium, barium and iron are preferable. As the halides, chlorides, bromides and iodides of the above-mentioned metals are preferable, and the chlorides are particularly preferable.

A ratio of the metal halide is preferably in the range of 0.1 to 10 parts by weight with respect to 100 parts by weight of metallic iron. Substantially all of the metal halide adheres to the metallic iron, and the metal halide which is free in the thermoplastic resin mixture are scarcely present. Therefore, in order that the metallic halide may effectively function, its amount of 0.1 to 5 parts by weight is enough.

The metal halide is desirably added in such a manner that the metal halide is not easily separated from the metallic iron in the thermoplastic resin mixture. A preferable method for allowing the metal halide to adhere to the metallic iron is, for example, a method which comprises grinding and mixing the metal halide and the metallic iron by the use of a ball mill or a speed mill to bury the fine particles of the metal halide in concavities on the surfaces of metallic iron, a method which comprises sticking the fine particles of the metal halide on the surfaces of metallic iron by the use of a binder, or a method which comprises mixing an aqueous metal halide solution with metallic iron, and then drying the resulting mixture so that the fine particles of the metal halide may be deposited on the surfaces of metallic iron.

A moisture content of the particulate deoxidizing composition which is dispersed in the thermoplastic resin mixture is preferably 0.2% by weight or less, more preferably 0.1% by weight. Moreover, an average particle diameter of the particulate deoxidizing composition is preferably in the range of 5 to 200 µm, more preferably 5 to 50 µm.

In the present invention, in addition to the deoxidizing composition, other additives can be added to the thermoplastic resin mixture, if necessary. Examples of the additives include colorants such as organic dyes, inorganic dyes and pigments, dispersants such as silane-containing compounds and titanate-containing compounds, a water absorbing agent such as a polyacrylic acid-containing compound, fillers such as clay, mica, silica and starch, zeolite, active carbon and deodorizer.

A content of the deoxidizing composition in the oxygen absorbing resin of the present invention is preferably in the range of 10 to 70% by weight, more preferably 20 to 70% by weight. If the content of the deoxidizing composition is less than the above-mentioned range, an oxygen absorbing performance is insufficient, and on the other hand, if it is more than the above-mentioned range, the working properties of the resin are poor. Therefore, the content of the deoxidizing composition should suitably be selected in consideration of these results.

The reason why the oxygen absorbing resin of the present invention having the above-mentioned constitution can exert the excellent oxygen absorbing performance is not definite, but the following can be presumed. The higher the oxygen permeability constant of the thermoplastic resin mixture constituting the oxygen absorbing resin is, the higher the oxygen absorbing velocity of the deoxidizing composition is, but in the case that the thermoplastic resin having a high flexural modulus and a poor flexibility is used, the growth of rust on the surface of the deoxidizing composition which accompanies the oxygen absorbing reaction of the deoxidizing composition is disturbed by the so-called hard resin having the high flexural modulus, so that the oxygen absorbing reaction is stopped on the way, with the result that an amount of oxygen which can substantially be absorbed is noticeably limited as compared with the ability of the deoxidizing composition In the present invention, there are used the thermoplastic elastomer and/or the ethylene propylene copolymer having the high oxygen permeability constant, the low flexural modulus and the sufficient flexibility, whereby the growth of the rust in the deoxidizing composition which accompanies the oxygen absorbing reaction is scarcely disturbed. In consequence, the oxygen absorbing resin in the present invention can possess the practical oxygen absorbing velocity and can absorb the sufficient amount of oxygen.

The oxygen absorbing resin of the present invention can be received together with a material to be preserved such as a food, a drink or a drug in a bag having gas barrier properties, as in the case of a conventional deoxidizing agent contained in a small bag, whereby the oxygen absorbing resin can absorb oxygen in the bag to prevent the oxidation and deterioration of the received material, which permits the long-term preservation of the material.

Desirably, the oxygen absorbing resin of the present invention is molded into sheets or films, and they are then cut into a suitable size when used. In the present invention, the deoxidizing composition is dispersed in the resin, and therefore there is not a problem of the conventional deoxidizing agent in the small bag that the deoxidizing composition is scattered. If the material to be preserved tends to be contaminated with the deoxidizing composition in the resin, the oxygen absorbing resin of the present invention may be received in a small bag having high ventilation properties when used, or the oxygen absorbing resin can be stuck on the inside surface of a lid, a container or a bag, and then covered with an isolated film having the high ventilation properties when used.

Furthermore, by the utilization of various molding methods, there can be formed multi-layer packaging containers such as trays, cups, cases, bottles, tubes, top films and bags in which an oxygen-permeable layer is laminated on a layer comprising the oxygen absorbing resin of the present invention. In addition, if a gas barrier layer is laminated on the outside surface of the layer comprising the oxygen absorbing resin, the rapid deterioration of the oxygen absorbing performance of the deoxidizing composition can be prevented, so that the material to be preserved can be preserved for a long period of time. The oxygen absorbing resin of the present invention cannot be limited to these use examples, and it can be used in various forms as a substance for preventing the oxidation and deterioration of the material to be preserved.

Next, reference will be made to a deoxidizing multi-layer structure which is characterized by having a layer (II) comprising the above-mentioned oxygen absorbing resin, a layer (I) comprising a thermoplastic resin layer having an oxygen permeability of 800 cc/m$^2$.atm.day (23° C., 50% RH) or more, and a layer (III) having gas barrier properties. This description will be done with reference to drawings, but the scope of the present invention should not be limited by these drawings. Hereinafter, the deoxidizing multi-layer structure will be referred to simply as "the multi-layer structure" on occasion.

As shown in FIG. 1, when the multi-layer structure of the present invention is used, the layer (I) is an inner-most layer, the layer (II) is an intermediate layer, and the layer (III) is an outermost layer. The layer (II), to which water has been fed, absorbs oxygen mainly penetrated through the layer (I).

Figure 2:
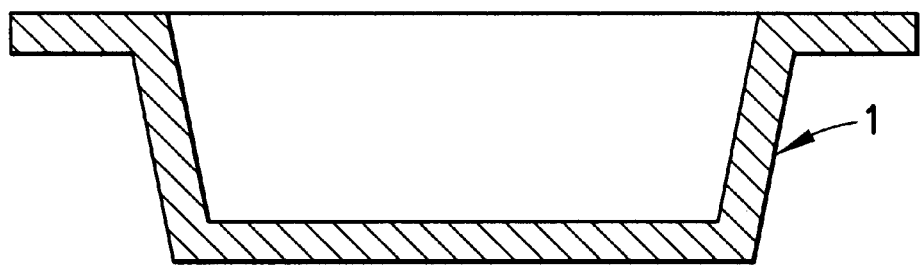
FIG. 2 is a sectional view of a tray-like container comprising the deoxidizing multi-layer structure regarding the present invention.
Figure 3:
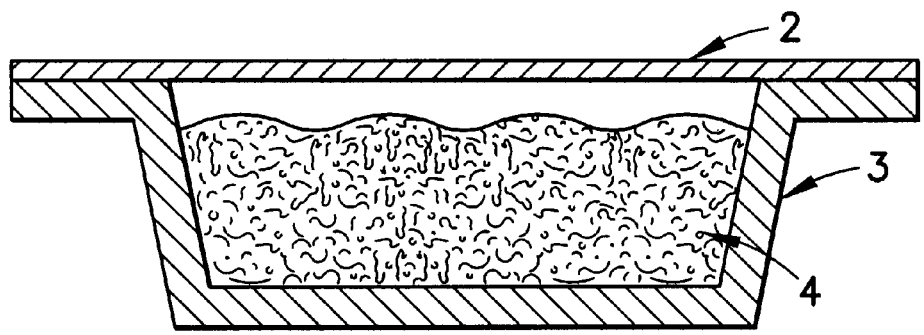
FIG. 3 is a sectional view of a package in which a gas barrier tray-like container receiving a food is top-sealed with the deoxidizing multi-layer structure regarding the present invention.

The packaging container of the present invention at least partially comprises the multi-layer structure, and the package in which the layer (I) is the innermost layer can be formed. For example, as shown in FIG. 2, the multi-layer structure of the present invention can be formed into a tray-like container. When used, a material to be packed is put in this container, and it is then sealed with a barrier tip film. Moreover, as shown in FIG. 3, the barrier tray in which the material to be packed is put can be sealed with the multi-layer structure of the present invention. In addition, the multi-layer structure of the present invention can also be stuck on a gas barrier film or the other multi-layer structure to form a bag.

The deoxidizing multi-layer structure of the present invention and the packaging container made of this multi-layer structure can take the above-mentioned constitution, whereby they can possess the same oxygen absorbing performance as in the case that the conventional deoxidizing agent in the small bag is used. Moreover, the function of the multi-layer structure and the packaging container can sufficiently be exerted without requiring a specific treatment such as a high-temperature treatment. Needless to say, the packaging container of the present invention can be subjected to a high-temperature treatment such as hot pack, heating sterilization after the packing, and a retort treatment. Such a high-temperature treatment can raise an environmental temperature, whereby the oxygen permeability of the layers (I) and (II) can be improved, and the oxygen absorbing velocity of the deoxidizing composition can be accelerated and so a more rapid oxygen absorption can be accomplished.

In the multi-layer structure of the present invention, the layer (I) can play a role of an isolated layer for surely preventing the layer (II) from directly coming in contact with the material to be packed, and the layer (I) is required to have the performance of achieving the prompt and efficient oxygen permeation, and also required to possess the highest possible oxygen permeability. Furthermore, the layer (III) is required to have the performance of preventing the invasion of oxygen from the outside, and also required to possess the lowest possible oxygen permeability. In this connection, each of the layers (I) and (III) is not limited to a single layer, and for example, it may be a multilayer including an adhesive layer and the like. In the case that an inner bag is further formed inside the package, or in the case that the outside of the package is further covered with a film or a case, the oxygen permeability of the layers (I) and (III) should be decided in consideration of these conditions.

The layer (I) comprises one or more layers, and it has an oxygen permeability of 800 cc/m$^2$.atm.day or more, preferably 1000 cc/m$^2$.atm.day or more, irrespective of the thickness of the respective layers and presence/absence of an adhesive. If the oxygen permeability is less than 800 cc/m$^2$.atm.day, the oxygen permeability of the layer (I) determines a rate of the oxygen absorbing reaction which occurs in the layer (II), so that the oxygen absorbing performance of the multi-layer structure itself deteriorates inconveniently. Incidentally, the oxygen permeability can be obtained by first forming a bag having a surface area of 400 cm$^2$ from a film having the same resin constitution and the same thickness as in the layer (I), introducing 250 cc of a nitrogen gas into the bag and then sealing it, allowing the bag to stand at 23° C. and 50% RH for 6 hours, and then measuring an oxygen concentration in the bag by gas chromatography.

Examples of the resin constituting the layer (I) include polyolefins such as polyethylene, polypropylene and polymethylpentene, modified polyolefins thereof, graft polymers with silicone resins, polyesters such as polyethylene terephthalate, and polyamides such as nylon 6 and nylon 66. These resins may be used singly or in a combination of two or more thereof. Among these resins, polyolefins such as polyethylene, polypropylene and polymethylpentene can preferably be used, because of a high oxygen permeability and a low cost. The morphology of the layer (I) may be either of a single layer and a multilayer, and there may be used a nonwoven fabric or a film having many fine holes which comprises any of these resins.

The thinner the layer (I) is, the more excellent the ventilation properties are, but in consideration of moldability, opacifying properties and an isolation effect between the layer (II) and the material to be preserved, the thickness of the layer (I) is preferably in the range of 10 to 200 μm. Moreover, to the layer (I), there can be added various additives such as a pigment for opacification and coloring, an additive for improving heat-sealing properties, a filler, an antistatic agent and a stabilizer.

The layer (I) can be formed by co-extrusion, lamination, inner bag forming or the like, and if necessary, the layer (I) may be stuck to the layer (II) with the interposition of an adhesive layer. The co-extrusion is preferably carried out by co-extruding the layer (I) together with the layer (II), and in this case, the layer (I) desirably has adhesive properties which permits the co-extrusion together with the layer (II) and it is also desirably a single thin layer.

The layer (II) comprises the above-mentioned oxygen absorbing resin of the present invention. The thickness of this layer (II) is usually 1000 μm or less, preferably 500 μm or less.

Furthermore, the layer (III) has gas barrier properties, and its oxygen permeability is preferably less than 100 cc/$m^2$.atm.day (23° C., 100% RH), more preferably 50 cc/$m^2$.atm.day (23° C., 100% RH) or less. The oxygen permeability of the layer (III) is desirably as low as possible in a range in which the moldability, the cost and the like are allowable. According to such a constitution, when the package is made of the multi-layer structure regarding the present invention, the amount of oxygen penetrated through the package from the outside can be decreased, and the amount of the deoxidizing composition to be used can be decreased. In addition, the preservability of the material in the package can be improved.

Examples of a material constituting the layer (III) include polyolefins such as polyethylene, polypropylene and polymethylpentene, modified polyolefins thereof, polyesters such as polyethylene terephthalate, and crystalline polyamides such as nylon 6, nylon 66 and MX nylon, amorphous polyamides, synthetic resins such as ethylene-vinyl alcohol copolymers, polyvinyl chloride and polyvinylidene chloride, an aluminum foil, and inorganic oxide-deposited films such as an aluminum-deposited film and a silica-deposited film, and they can preferably be used. The layer (III) may be either of a single layer and a multilayer, and a stretched layer is also usable.

Moreover, to the layer (III), there can be added various additives such as a filler, a colorant, an antistatic agent and a stabilizer. In particular, the blend of a colorant such as a dye or a pigment with the resin constituting the layer (III) or the layer (I) can conceal the layer (II) and can impart beauty to the packaging container, and so the blend of the colorant is important to give a merchandise value to the multi-layer structure and the packaging container of the present invention.

The layer (III) can be formed by co-extrusion, lamination, heat shrinkage packaging, wrap packaging, outer bag packaging or the like, and if necessary, the layer (III) may be stuck to the layer (II) with the interposition of an adhesive layer. The co-extrusion can be carried out by co-extruding the layer (II), or the layer (II) together with the layer (I).

The packaging container of the present invention can be obtained by first preparing the multi-layer structure of the present invention, and then molding this structure into the packaging container, or it can be obtained by directly molding materials or members constituting the respective layers of the multi-layer structure into the packaging container having the multi-layer structure. In either case, for the formation of the multi-layer structure and the packaging container, there can be used a known technique which can be applied to conventional resin molding, packaging container molding or the like. For example, the packaging container can directly be formed by a known molding technique such as extrusion using a T-die, a circular die or the like, injection molding, direct blow or stretch blow. Moreover, a sheet, a film, a tube or a parison obtained by such a technique can be subjected to vacuum molding, air-pressure molding, plug-assist forming, overhang molding or blow molding to form the packaging container. In addition, after the molding of the main portion of the packaging container, this main portion can be combined with another molded article, or there can also be carried out a lamination work such as hot laminating, dry laminating, extrusion laminating or hot-melt laminating, or a lamination work such as coating. Furthermore, the outer packaging or the inner packaging by a shrink package, a shrink label package, a case or a bag can be applied.

Examples of the packaging container regarding the present invention include trays, cups, cases, bottles, tubes and bags. Moreover, there can also be taken a constitution in which the deoxidizing multi-layer film regarding the present invention is used as a top film for a gas barrier container such as the tray or the cup. In the usage of the packaging container of the present invention, it is necessary that the packaging container is finally sealed to prevent the penetration of oxygen from the outside of the packaging container. As this sealing technique, there can be applied a conventional technique using a closure, a top film, an outer packaging container or the like.

With regard to the oxygen absorbing performance which has been a problem of the conventional techniques, the oxygen absorbing resin of the present invention has about the same oxygen absorbing velocity as that of the deoxidizing agent in the small bag and exerts the higher oxygen absorption performance as compared with the conventional oxygen absorbing resin.

Furthermore, the deoxidizing multi-layer structure of the present invention utilizing this oxygen absorbing resin and the packaging container comprising this structure can completely shut out the penetration of oxygen from the outside, and can exert the same oxygen absorption performance as in the case that the conventional deoxidizing agent in the small bag is used. Therefore, in packing the material to be put in the packaging container, a treatment such as inert gas replacement is not required any more. In addition, there is not an alien feeling or a resistant feeling which is caused in the case that the deoxidizing agent in the small bag is put in the packaging container together with the contents, and the contamination of the contents by the scatter of the deoxidizing agent is not present. Moreover, in the deoxidizing multi-layer structure of the present invention, its inside surface comprises a hole-free resin film and hence it is excellent in liquid resistance, so that the deoxidizing multi-layer structure can be applied to liquid materials such as foods having a high water content and drinks. Furthermore, the deoxidizing multi-layer structure is excellent in microwave resistance and thus the deoxidizing multi-layer structure containing the food can be heated and cooked in a microwave oven as it is. As understood from the above, the deoxidizing multi-layer structure of the present invention and the packaging container comprising this structure have various excellent features, and so they can be utilized to preserve materials such as drinks, foods and drugs in many fields which are easily affected by oxygen.

Next, the present invention will be described in more detail with reference to examples.

Example 1

An iron powder whose 50% by weight had a particle diameter of 35 μm was placed in a vacuum mixing drying machine equipped with a heating jacket, and an aqueous mixed solution obtained by mixing calcium chloride, sodium chloride and water in a ratio of 1:1:5 (parts by weight) based on 100 parts by weight of the iron powder was sprayed, while the iron powder was heated and dried at 130° C. under a reduced pressure of 10 mmHg, thereby obtaining a particulate deoxidizing composition in which calcium chloride and sodium chloride were deposited on the surfaces of the iron powder.

Next, by the use of a unidirectionally rotational twin-screw extruder having a cylinder diameter of 45 mm, a grade name Dynalon 1320P (a hydrogenated styrene butadiene copolymer, made by Japan Synthetic Rubber Co., Ltd, hardness=39) was mixed with polypropylene and the deoxidizing composition in a ratio of Dynalon 1320P:polypropylene:the deoxidizing composition=2:5:3. Afterward, the mixture was cooled by a net belt equipped with a blower, and then treated through a pelletizer to obtain oxygen absorbing resin pellets 1. Furthermore, test pieces of Dynalon 1320P:polypropylene=2:5 which was the thermoplastic resin mixture used to obtain the oxygen absorbing resin pellets 1, i.e., single layer films (thickness=100 µm) were prepared, and a flexural modulus and an oxygen permeability constant at 23° C. and 50% RH were measured in the above-mentioned manner. As a result, the flexural modulus and the oxygen permeability constant of the thermoplastic resin mixture was 220 MPa and 200 cc.mm/m$^2$.atm.day, respectively.

Next, the oxygen absorbing resin pellets 1 were treated by a film manufacturing device comprising an extruder, a feed block, a T-die, a cooling roll and a film winding machine to obtain a deoxidizing film 1 having a thickness of 150 µm and comprising the oxygen absorbing resin pellets 1. The thus obtained deoxidizing film 1 was cut into a square of 10 cm×10 cm, and the film pieces and about 10 g of a hygroscopic resin sufficiently impregnated with water were placed in bags comprising aluminum foil laminate films heat-sealed along three edges thereof. Afterward, 100 cc of air and 2000 cc of air were introduced into the bags, respectively, and these bags were heat-sealed to airtightly close them and they were then preserved at 23° C. For the bag containing 100 cc of air, a change with day of an oxygen concentration in the bag was inspected by gas chromatography, and for the bag containing 2000 cc of air, an oxygen absorption amount of the film after preservation for 30 days was similarly inspected by gas chromatography. The results are shown in Table 1.

Example 2

The same procedure as in Example 1 was repeated except that a mixing ratio of Dynalon 1320P:polypropylene:a deoxidizing composition=5:2:3 was employed, thereby obtaining oxygen absorbing resin pellets 2. Furthermore, test pieces of Dynalon 1320P:polypropylene=5:2 which was a thermoplastic resin mixture used to obtain the oxygen absorbing resin pellets 2, i.e., single layer films (thickness= 100 µm) were prepared, and a flexural modulus and an oxygen permeability constant at 23° C. and 50% RH were measured in the above-mentioned manner. As a result, the flexural modulus and the oxygen permeability constant of the thermoplastic resin mixture was 100 MPa or less and 700 cc.mm/m$^2$.atm.day, respectively.

Next, the same film formation as in Example 1 was carried out except that the oxygen absorbing resin pellets 2 was used in place of oxygen absorbing resin pellets 1, thereby obtaining a deoxidizing film 2. Afterwards oxygen absorption was measured by the same procedure as in Example 1, and the measured results are shown in Table 1.

Example 3

A deoxidizing composition obtained in Example 1 and a grade name Dai-pla MK Resin MK-1 (made by Dainippon Plastic Co., Ltd., hardness=78) which was a kind of olefinic elastomer were used to obtain oxygen absorbing resin pellets 3 having a weight ratio of Dai-pla MK Resin MK-1:polypropylene:the deoxidizing composition=5:2:3. Furthermore, test pieces of Dai-pla MK Resin MK-1:polypropylene=5:2 which was a thermoplastic resin mixture used to obtain the oxygen absorbing resin pellets 3 i.e., single layer films (thickness=100 µm) were prepared, and a flexural modulus and an oxygen permeability constant at 23° C. and 50% RH were measured in the above-mentioned manner. As a result, the flexural modulus and the oxygen permeability constant of the thermoplastic resin mixture was 300 MPa and 400 cc.mm/m$^2$.atm.day, respectively.

Next, the same film formation as in Example 1 was carried out except that the oxygen absorbing resin pellets 3 was used in place of oxygen absorbing resin pellets 1, thereby obtaining a deoxidizing film 3. Afterward, oxygen absorption was measured by the same procedure as in Example 1, and the measured results are shown in Table 1.

Example 4

A deoxidizing composition obtained in Example 1 and a grade name Toughmer P-0680 (made by Mitsui Petrochemical Industries, Ltd. hardness=63) which was a kind of ethylene propylene copolymer were used to obtain oxygen absorbing resin pellets 4 having a weight ratio of Toughmer P-0680:polypropylene:the deoxidizing composition=5:2:3. Furthermore, test pieces of Toughmer P-0680:polypropylene=5:2 which was a thermoplastic resin mixture used to obtain the oxygen absorbing resin pellets 4, i.e., single layer films (thickness=100 µm) were prepared, and a flexural modulus and an oxygen permeability constant at 23° C. and 50% RH were measured in the above-mentioned manner. As a result, the flexural modulus and the oxygen permeability constant of the thermoplastic resin mixture was 300 MPa and 450 cc.mm/m$^2$.atm.day, respectively.

Next, the same film formation as in Example 1 was carried out except that the oxygen absorbing resin pellets 4 was used in place of oxygen absorbing resin pellets 1, thereby obtaining a deoxidizing film 4. Afterward, oxygen absorption was measured by the same procedure as in Example 1, and the measured results are shown in Table 1.

Comparative Example 1

A deoxidizing composition obtained in Example 1 was used to obtain oxygen absorbing resin pellets 5 having a weight ratio of polypropylene:the deoxidizing composition= 7:3. Furthermore, a test piece of polypropylene which was a resin used to obtain the oxygen absorbing resin pellets 5, i.e., a single layer film (thickness=100 µm) was prepared, and a flexural modulus and an oxygen permeability constant at 23° C. and 50% RH were measured in the above-mentioned manner. As a result, the flexural modulus and the oxygen permeability constant of the resin was 1000 MPa and 80 cc.mm/m$^2$.atm.day, respectively.

Next, the same film formation as in Example 1 was carried out except that the oxygen absorbing resin pellets 5 was used in place of oxygen absorbing resin pellets 1, thereby obtaining a deoxidizing film 5. Afterward, oxygen absorption was measured by the same procedure as in Example 1, and the measured results are shown in Table 1.

Comparative Example 2

A deoxidizing composition obtained in Example 1 was used to obtain oxygen absorbing resin pellets 6 having a weight ratio of Dynalon 1320P:polypropylene:the deoxidizing composition=5:65:30. Furthermore, a test piece of Dynalon 1320P:polypropylene=5:65 which was a thermoplastic resin mixture used to obtain the oxygen absorbing resin pellets 6, i.e., a single layer film (thickness=100 µm) was prepared, and a flexural modulus and an oxygen permeability constant at 23° C. and 50% RH were measured in the above-mentioned manner. As a result, the flexural modulus and the oxygen permeability constant of the thermoplastic resin mixture was 700 MPa and 110 cc.mm/m$^2$.atm.day, respectively.

Next, the same film formation as in Example 1 was carried out except that the oxygen absorbing resin pellets 6 was used in place of oxygen absorbing resin pellets 1, thereby obtaining a deoxidizing film 6. Afterward, oxygen absorption was measured by the same procedure as in Example 1, and the measured results are shown in Table 1.

Comparative Example 3

A deoxidizing composition obtained in Example 1 and a grade name TPX DX845 (polymethylpentene, made by Mitsui Petrochemical Industriesg Ltd.) were used to obtain oxygen absorbing resin pellets 7 having a weight ratio of TPX DX845:polypropylene:the deoxidizing composition= 5:2:3. Furthermore, a test piece of TPX DX845:polypropylene=5:2 which was a thermoplastic resin mixture used to obtain the oxygen absorbing resin pellets 7, i.e., a single layer film (thickness=100 µm) was prepared, and a flexural modulus and an oxygen permeability constant at 23° C. and 50% RH were measured in the above-mentioned manner. As a results the flexural modulus and the oxygen permeability constant of the thermoplastic resin mixture was 1200 MPa and 530 cc.mm/m$^2$.atm.day, respectively.

Next, the same film formation as in Example 1 was carried out except that the oxygen absorbing resin pellets 7 was used in place of oxygen absorbing resin pellets 1, thereby obtaining a deoxidizing film 7. Afterwards oxygen absorption was measured by the same procedure as in Example 1, and the measured results are shown in Table 1.

As shown in Table 1, in Examples 1 to 4 where the deoxidizing composition is blended with the thermoplastic resin mixture having a flexural modulus of 600 MPa or less and an oxygen permeability constant of 130 cc.mm/m$^2$.atm.day (23° C., 50% RH) or more, an oxygen absorbing velocity is more excellent and an oxygen absorption performance is two or three times higher than in Comparative Example 1 which is a conventional example. In Comparative Example 2 where the amount of Dynalon 1320P which is a styrenic elastomer is small, the flexural modulus and the oxygen permeability constant both are low, and in Comparative Example 3 where the thermoplastic resin mixture of TPX DX845 which is polymethylpentene having a high oxygen permeability and polypropylene is used, the oxygen permeability constant is high but the flexural modulus is more than 600 MPa. Therefore, in Comparative Examples 2 and 3, the oxygen absorbing velocity is not considered to be sufficient as compared with Examples 1 to 4, and an oxygen absorption amount is much lower than in Examples 1 to 4. In consequences it has been apparent from the results of the above-mentioned examples and comparative examples that the blend of the thermoplastic resin mixture having a flexural modulus of 600 MPa or less and an oxygen permeability constant of 130 cc.mm/m$^2$.atm.day (23° C., 50% RH) or more with the deoxidizing composition can exert the oxygen absorbing velocity equal to that of a deoxidizing agent in a small bag and can achieve a larger oxygen absorption amount than a conventional example.

TABLE 1

| | Properties of Thermoplastic Resin Mixture | | Oxygen Concentration in Aluminum Bag (%) | | Oxygen Absorption |
|---|---|---|---|---|---|
| | Flexural Modulus (MPa) | Oxygen Permeability Constant (cc · mm/m$^2$ · atm · day) | At Start | After 1 day | for 30 days (ml) |
| Example 1 | 220 | 200 | 21 | <0.1 | 120 |
| Example 2 | <100 | 700 | 21 | <0.1 | 130 |
| Example 3 | 300 | 400 | 21 | <0.1 | 120 |
| Example 4 | 300 | 450 | 21 | <0.1 | 130 |
| Comp. Ex. 1 | 1000 | 80 | 21 | 6.0 | 50 |
| Comp. Ex. 2 | 700 | 110 | 21 | 1.5 | 60 |
| Comp. Ex. 3 | 1200 | 530 | 21 | 2.0 | 40 |

Example 5

A deoxidizing film 1 obtained in Example 1 was cut into a square of 5 cm×5 cm, and the film pieces were then placed in a three-sealed bag (inside dimension=40 mm×40 mm) comprising films obtained by laminating a perforated polyethylene film on a Japanese paper. Afterward, this bag was then heat-sealed to airtightly close it. This bag and 200 g of cubic rice cakes were placed in a three-sealed gas barrier bag (inside dimension=230 mm×170 mm) comprising a polyvinylidene chloride-coated nylon (KON; thickness=15 µm) and polyethylene (PE; thickness=70 µm), and air was then introduced into the bag so that an air volume in the bag might be about 100 cc and the bag was then heat-sealed to airtightly close it. Afterward, the bag was preserved at 23° C. for 6 months, and a change with day of an oxygen concentration in the bag and an appearance of the cubic rice cakes were observed. As a result, the oxygen concentration in the bag lowered from 21% at the start of the preservation to 0.1% or less within one day, so that the taste of the cubic rice cakes was maintained in a good state even after the preservation for 6 months, and the appearance of the cubic rice cakes did not change. According to this example, it was confirmed that the taste and the appearance of the food or the like could normally be maintained for a long period of time by utilizing the oxygen absorbing resin of the present invention for the preservation of the food or the like.

Example 6

A 4-kind 6-layer multi-layer sheet molding device comprising the first to fourth extruders, a feed blocks a T-die, a cooling roll and a sheet winding machine was used, and mixed pellets of white pigment-containing polypropylene were put in the first extruder; oxygen absorbing resin pellets 1 obtained in Example 1 were put in the second extruder; an ethylene-vinyl alcohol copolymer was put in the third extruder; and a maleic anhydride-modified polypropylene was put in the fourth extruder. Afterward, these materials were extruded through the various extruders to obtain a multi-layer structure 1 shown in FIG. 1. In this multi-layer structure 1, there were laminated a layer (I) (60 μm) comprising the white pigment-containing polypropylene, a layer (II) (150 μm) comprising the oxygen absorbing resin pellets 1, and a layer (III) constituted of a layer 31 (20 μm) comprising the maleic anhydride-modified polypropylene, a layer 32 (30 μm) comprising the ethylene-vinyl alcohol copolymer, a layer 33 (20 μm) comprising the maleic anhydride-modified polypropylene and a layer 34 (320 μm) comprising the white pigment-containing polypropylene in this order. The value in each parenthesis denotes a film thickness.

Furthermore, a single layer film (thickness=60 μm) of the white pigment-containing polypropylene used to form the layer (I) was newly prepared, and its oxygen permeability at 23° C. and 50% RH was measured. As a result, it was 1200 cc.mm/m².atm.day.

Next, the thus obtained multi-layer structure 1 was cut into a square of 10 cm×10 cm, and the resulting film pieces and about 10 g of a hygroscopic resin sufficiently impregnated with water were placed in bags comprising aluminum foil laminate films heat-sealed along three edges thereof. Afterward, 100 cc of air and 2000 cc of air were introduced into the bags, respectively, and these bags were then heat-sealed to airtightly close them. Next, these bags were preserved at 23° C., and for the bag containing 100 cc of air, a change with day of an oxygen concentration in the bag was inspected by gas chromatography, and for the bag containing 2000 cc of air, an oxygen absorption amount of the film after preservation for 30 days was similarly inspected by gas chromatography. The results are shown in Table 2.

Example 7

The same sheet formation procedure as in Example 6 was conducted except that oxygen absorbing resin pellets 2 obtained in Example 2 were used in place of oxygen absorbing resin pellets 1, thereby obtaining a multi-layer structure 2. Afterward, oxygen absorption was measured in the same manner as in Example 6, and the measured results are shown in Table 2.

Example 8

The same sheet formation procedure as in Example 6 was conducted except that oxygen absorbing resin pellets 3 obtained in Example 3 were used in place of oxygen absorbing resin pellets 1, thereby obtaining a multi-layer structure 3. Afterward, oxygen absorption was measured in the same manner as in Example 6, and the measured results are shown in Table 2.

Example 9

The same sheet formation procedure as in Example 6 was conducted except that oxygen absorbing resin pellets 4 obtained in Example 4 were used in place of oxygen absorbing resin pellets 1, thereby obtaining a multi-layer structure 4. Afterward, oxygen absorption was measured in the same manner as in Example 6, and the measured results are shown in Table 2.

Example 10

The same sheet formation procedure as in Example 6 was conducted except that pellets obtained by mixing white pigment-containing polypropylene with TPX DX845 (polymethylpentene, made by Mitsui Petrochemical Industries, Ltd.) in a ratio of 7:3 were used as a layer (I), thereby obtaining a multi-layer structure 5. Afterward, oxygen absorption was measured in the same manner as in Example 6, and the measured results are shown in Table 2.

Furthermore, a single layer film (thickness=60 μm) comprising the white pigment-containing polypropylene and TPX DX845 in a ratio of 7:3 which were used to form the layer (I) was newly prepared, and its oxygen permeability at 23° C. and 50% RH was measured. As a result, it was 2500 cc.mm/m².atm.day.

Comparative Example 4

The same sheet formation procedure as in Example 6 was conducted except that oxygen absorbing resin pellets 5 obtained in Comparative Example 1 were used in place of oxygen absorbing resin pellets 1, thereby obtaining a multi-layer structure 6. Afterward, oxygen absorption was measured in the same manner as in Example 6, and the measured results are shown in Table 2.

Comparative Example 5

The same sheet formation procedure as in Example 6 was conducted except that oxygen absorbing resin pellets 6 obtained in Comparative Example 2 were used in place of oxygen absorbing resin pellets 1; thereby obtaining a multi-layer structure 7. Afterward, oxygen absorption was measured in the same manner as in Example 6, and the measured results are shown in Table 2.

Comparative Example 6

The same sheet formation procedure as in Example 6 was conducted except that oxygen absorbing resin pellets 7 obtained in Comparative Example 3 were used in place of oxygen absorbing resin pellets 1, thereby obtaining a multi-layer structure 8. Afterward, oxygen absorption was measured in the same manner as in Example 6, and the measured results are shown in Table 2.

Comparative Example 7

The same sheet formation procedure as in Example 6 was conducted except that the thickness of a layer (I) was 120 μm, thereby obtaining a multi-layer structure 9. Afterward, oxygen absorption was measured in the same manner as in Example 6, and the measured results are shown in Table 2.

Furthermore, a single layer film (thickness=120 μm) of a white pigment-containing polypropylene which were used to form the layer (I) was newly prepared, and its oxygen permeability at 23° C. and 50% RH was measured. As a result, it was 700 cc.mm/m².atm.day.

TABLE 2

|  | Layer (I) | Thermoplastic Resin Mixture of Layer (II) | |
|---|---|---|---|
|  | Oxygen Permeability (cc/m² · atm · day) | Flexural Modulus (MPa) | Oxygen Permeability Constant (cc · mm/m² · atm · day) |
| Example 6 | 1200 | 220 | 200 |
| Example 7 | 1200 | <100 | 700 |
| Example 8 | 1200 | 300 | 400 |
| Example 9 | 1200 | 300 | 450 |
| Example 10 | 2500 | 220 | 200 |
| Comp. Ex. 4 | 1200 | 1000 | 80 |
| Comp. Ex. 5 | 1200 | 700 | 110 |
| Comp. Ex. 6 | 1200 | 1200 | 530 |
| Comp. Ex. 7 | 700 | 220 | 200 |

TABLE 2-continued

|  | Oxygen Concencentration in Aluminum Bag (%) | | | Oxygen Absorption for 30 Days |
|---|---|---|---|---|
|  | At Start | After 2 days | After 4 days | (ml) |
| Example 6 | 21 | 1.0 | <0.1 | 90 |
| Example 7 | 21 | 0.3 | <0.1 | 120 |
| Example 8 | 21 | 0.8 | <0.1 | 100 |
| Example 9 | 21 | 0.8 | <0.1 | 90 |
| Example 10 | 21 | 0.3 | <0.1 | 110 |
| Comp. Ex. 4 | 21 | 10.3 | 6.0 | 30 |
| Comp. Ex. 5 | 21 | 6.1 | 1.5 | 50 |
| Comp. Ex. 6 | 21 | 7.3 | 2.0 | 30 |
| Comp. Ex. 7 | 21 | 4.6 | 0.9 | 50 |

As shown in Table 2, in Examples 6 to 10 where the deoxidizing composition is blended with the thermoplastic resin mixture having a flexural modulus of 600 MPa or less and an oxygen permeability constant of 130 cc.mm/m$^2$.atm.day (23° C., 50% RH) or mores an oxygen absorbing velocity is more excellent and an oxygen absorption performance is two or three times higher than in Comparative Example 4 which is a conventional example.

In Comparative Example 5 where the amount of Dynalon 1320P which is a styrenic elastomer is small, the physical properties improvement effect of the thermoplastic resin mixture is insufficient, so that an oxygen absorption performance also insufficient, and in Comparative Example 6 where polymethylpentene is added, the oxygen permeability constant is high but the flexural modulus is inconveniently high, so that the oxygen absorption performance is poor. Furthermore, in Comparative Example 7, the oxygen permeability of the layer (I) is low, so that the oxygen absorption performance is insufficient.

Example 11

A multi-layer structure 1 obtained in Example 6 was subjected to plug-assist forming at about 180° C. by the use of a vacuum forming machine, a layer (I) being used as an inner film, to obtain a tray-like container (length 150 mm×width 100 mm×depth 30 mm, internal volume=350 cc) as shown in FIG. 2.

Next, 250 g of a boiled pasta was placed in the thus obtained tray-like container, and this tray-like container was then heat-sealed with a top film by the use of a cup sealer to airtightly close it. The top film had gas barrier properties and a 5-layer structure constituted of polypropylene (30 μm), a maleic anhydride-modified polypropylene (5 μm), an ethylene-vinyl alcohol copolymer (10 μm), a maleic anhydride-modified polypropylene (5 μm) and a nylon (20 μm). The value in each parenthesis denotes a film thickness.

Next, the tray-like container airtightly containing the boiled pasta was preserved at room temperature for 90 days, and an oxygen concentration in the bag was measured with day by gas chromatography and a preservation state of the boiled pasta was observed. In addition, a small hole was formed through the top film of the tray-like container airtightly containing the boiled pasta, and it was then heated for 5 minutes by a microwave oven (made by Mitsubishi Electric Corporation, 500 W) to inspect microwave resistance. The results are shown in Tables 3 and 4.

Example 12

The same test as in Example 11 was conducted except that a multi-layer structure 5 obtained in Example 10 was used in place of a multi-layer structure 1. The results are shown in Tables 3 and 4.

Comparative Example 8

The same test as in Example 11 was conducted except that a multi-layer structure 6 obtained in Comparative Example 4 was used in place of a multi-layer structure 1. The results are shown in Tables 3 and 4.

Comparative Example 9

The same test as in Example 11 was conducted except that a multi-layer structure 9 obtained in Comparative Example 7 was used in place of a multi-layer structure 1. The results are shown in Tables 3 and 4.

Comparative Example 10

The same sheet formation procedure as in Example 6 was conducted except that a layer (II) was not formed, thereby obtaining a sheet having no deoxidizing function. This sheet was used to prepare a tray-like container, and a boiled pasta and a deoxidizing agent in a small bag (made by Mitsubishi Gas Chemical Company, Inc., "Ageless FX") were put in the tray-like container. The same preservation test as in Example 11 was made. The results are shown in Tables 3 and 4.

TABLE 3

|  | Layer (I) Oxygen Permeability (cc/m$^2$ · atm · day) | Thermoplastic Resin Mixture of Layer (II) | | Oxygen Conc. in Bag (%) | | |
|---|---|---|---|---|---|---|
|  |  | Flexural Modulus (MPa) | Oxygen Permeability Constant (cc · mm/m$^2$ · atm · day) | At Start | After 2 days | After 4 days |
| Example 11 | 1200 | 220 | 190 | 21 | 0.2 | <0.1 |
| Example 12 | 2500 | 220 | 190 | 21 | <0.1 | <0.1 |
| Comp. Ex. 8 | 1200 | 1000 | 83 | 21 | 12.0 | 7.0 |
| Comp. Ex. 9 | 700 | 220 | 190 | 21 | 2.0 | 0.3 |
| Comp. Ex. 10 | — | — | — | 21 | <0.1 | <0.1 |

TABLE 4

|  | State of Pasta | | | Microwave |
|---|---|---|---|---|
|  | For 30 Days | For 60 Days | For 90 Days | Resistance |
| Example 11 | Taste was kept. | Taste was kept. | Taste was kept. | Good |
| Example 12 | Taste was kept. | Taste was kept. | Taste was kept. | Good |
| Comp. Ex. 8 | Mold gathered. | — | — | Good |
| Comp. Ex. 9 | Taste declined. | — | — | Good |
| Comp. Ex. 10 | Taste was kept. | Taste was kept. | Taste was kept. | Bag was broken. |

As shown in Tables 3 and 4, in Examples 11 and 12, the oxygen concentration in the bag lowered to 0.1% or less within 4 days to 2 days, and the appearance of the boiled pasta did not change even when it was preserved for 90 days and its taste was also maintained in a normal state. Even when heated by the microwave oven, any trouble was not observed on the tray-like container comprising the deoxidizing multi-layer sheet.

On the contrary, in Comparative Examples 8 and 9, an oxygen absorbing velocity in the tray-like container was low, so that mold gathered on the boiled pasta and its taste deteriorated after the preservation for 30 days. Furthermore, in Comparative Example 10 in which the deoxidizing agent in the small bag was used, the oxygen absorbing velocity was high, so that with regard to the taste maintenance of the boiled pasta, good results could be obtained. However, when heated by the microwave oven, the small bag was exploded to scatter the deoxidizing agent, and thus a problem remained.

Example 13

Sheet molding was carried out by the use of a film manufacturing device comprising an extruder, a feed block, a T-die, a cooling roll and a film winding machine to obtain a multi-layer structure 10 in which an aluminum foil was a gas barrier layer. In this multi-layer structure, there were laminated a layer (I) (30 $\mu$m) comprising a white pigment-containing polypropylene, a layer (II) (60 $\mu$m) comprising the oxygen absorbing resin pellets 4 obtained in Example 4, and a layer (III) constituted of a layer 31 (30 $\mu$m) comprising polypropylene, a layer 32 (10 $\mu$m) comprising the aluminum foil and a layer 33 (10 $\mu$m) comprising PET in this order. The value in each parenthesis denotes a film thickness.

Next, this multi-layer structure was laminated on a film having a nylon superneal (15 $\mu$m)-polypropylene (60 $\mu$m) constitution and a double layer structure, the layer (I) being used as an inner film, and these laminated films were then heat-sealed along three edges thereof to prepare a deoxidizing bag (length 200 mm×width 150 mm).

Next, an amino acid infusion plastic bag containing an amino acid infusion was received in the thus obtained deoxidizing bag, and the bag was then heat-sealed to airtightly close it. The deoxidizing bag in which the amino acid infusion bag was sealed was subjected to a heat treatment at 120° C. for 30 minutes by an air steam type high-temperature high-pressure sterilizing device, and then preserved at 23° C. During the preservation period, an oxygen concentration in the deoxidizing bag in which the amino acid infusion bag was sealed was measured with time, and a change of the color tone of the amino acid infusion was inspected on the 7th day. The results are shown in Table 5.

Comparative Example 11

The same sheet formation procedure as in Example 13 was conducted except that oxygen absorbing resin pellets 5 obtained in Comparative Example 1 were used in place of oxygen absorbing resin pellets 4, thereby obtaining a multi-layer structure 11. For the thus obtained multi-layer structures the same test as in Example 13 was made. The results are shown in Table 5.

Comparative Example 12

The same test as in Example 13 was made except that an aluminum foil laminate film having a PET (10 $\mu$m)-Al (10 $\mu$m)-PP (30 $\mu$m) constitution and a deoxidizing agent in a small bag (made by Mitsubishi Gas Chemical Company, Inc., "Ageless FX") were used in place to a multi-layer structure 10. The results are shown in Table 5.

TABLE 5

|  | Layer (I) Oxygen Permeability (cc/m$^2$ · atm · day) | Thermoplastic Resin Mixture of Layer (II) | | Oxygen Conc. in Bag (%) | | Tone of Infusion After 7 Days |
|---|---|---|---|---|---|---|
|  |  | Flexural Modulus (MPa) | Oxygen Permeability Constant (cc · mm/m$^2$ · atm · day) | After 2 Days | After 7 Days |  |
| Example 13 | 2700 | 220 | 190 | <0.1 | <0.1 | Good |
| Comp. Ex. 11 | 2700 | 1000 | 83 | 3.0 | <0.1 | Changed to brown |
| Comp. Ex. 12 | — | — | — | <0.1 | <0.1 | Good |

Furthermore, a film (thickness=30 $\mu$m) corresponding to the layer (I) was newly prepared, and its oxygen permeability at 23° C. and 50% RH was measured. As a result, it was 2700 cc.mm/m$^2$.atm.day.

As shown in Table 5 in Example 13, as in the case that the conventional deoxidizing agent in the small bag was used (Comparative Example 12), the oxygen concentration in the bag lowered to 0.1% or less after the preservation for 2 days, and the color tone of the amino acid infusion was kept good after the preservation for 7 days.

On the other hand, in Comparative Example 11, the oxygen absorbing velocity was low, and the color tone of the amino acid infusion changed to brown after the preservation for 7 days.

What is claimed is:

1. An oxygen absorbing resin comprising: (i) a deoxidizing composition comprising a metallic powder and a metal halide, the deoxidizing composition being dispersed in (ii) a thermoplastic resin mixture comprising (A) at least one thermoplastic resin selected from the group consisting of a thermoplastic elastomer and an ethylene propylene copolymer is contained in an amount in the thermoplastic resin mixture of 10 to 80% by weight and (B) a thermoplastic resin other than the component (A), the thermoplastic resin mixture having a flexural modulus of 600 MPa or less and an oxygen permeability of 130 cc.mm/m$^2$.atm.day or more determined at 23° C. and a relative humidity of 50%.

2. The oxygen absorbing resin according to claim 1, wherein (A) has a hardness of 95 or less.

3. The oxygen absorbing resin according to claim 1, wherein (A) is the thermoplastic elastomer which is a styrenic elastomer or an olefinic elastomer.

4. The oxygen absorbing resin according to claim 1, wherein the deoxidizing composition is in a form of a particulate deoxidizing composition containing, as a main agent, a reducing material which gives rise to an oxygen absorbing reaction when contacted with water.

5. The oxygen absorbing resin according to claim 1, wherein the deoxidizing composition is contained in the thermoplastic resin mixture in an amount of 10 to 70% by weight.

6. A deoxidizing multi-layer structure which comprises:
a layer (I) comprising a thermoplastic resin layer having an oxygen permeability of 800 cc/m$^2$.atm.day or more,
a layer (II) comprising an oxygen absorbing resin of claim 1, and
a layer (III) having gas barrier properties.

7. A packaging container which comprises at least partially a deoxidizing multi-layer structure of claim 6 and which has the layer (I) as an inner layer.

8. The oxygen absorbing resin according to claim 1, wherein the deoxidizing composition comprises the metal halide adhering to particles of the metallic powder.

9. The oxygen absorbing resin according to claim 1, wherein the metallic powder is iron powder and the metal halide is in an amount of 0.1 to 10 parts by weight with respect to 100 parts by weight of the metallic powder.

10. The oxygen absorbing resin according to claim 1, wherein the metallic powder is iron powder and the metal halide is in an amount of 0.1 to 5 parts by weight with respect to 100 parts by weight of the metallic powder.

11. The oxygen absorbing resin according to claim 2, wherein the metallic powder is iron powder and the metal halide is in an amount of 0.1 to 10 parts by weight with respect to 100 parts by weight of the metallic powder.

12. The oxygen absorbing resin according to claim 11, wherein (A) is contained in an amount in the thermoplastic resin mixture of 10 to 80% by weight.

13. The oxygen absorbing resin according to claim 3, wherein the flexural modulus is 500 MPa or less; the oxygen permeability is 140 cc.mm/m$^2$.atm.day or more, and (B) is selected from the group consisting of polyethylene, polypropylene, polymethylpentene, polystyrene, polyethylene terephthalate, nylon 6 and nylon 66.

14. The oxygen absorbing resin according to claim 1, wherein (A) is in an amount of 10 to 70% by weight in the thermoplastic resin mixture.

15. The oxygen absorbing resin according to claim 1, wherein the metallic power is selected from the group consisting of iron powder, aluminum powder and silicon powder.

16. The oxygen absorbing resin according to claim 1, wherein the metallic powder is iron powder having an average particle size of 50 μm or less.

17. The oxygen absorbing resin according to claim 14, wherein the metal of the metal halide is selected from the group consisting of lithium, potassium, sodium, magnesium, calcium, barium, copper, zinc, aluminum, tin, iron, cobalt and nickel; and the halogen of the metal halide is selected from the group consisting of chloride, bromide and iodide.

18. The oxygen absorbing resin according to claim 1, wherein the deoxidizing composition is contained in the oxygen absorbing resin in an amount of 20 to 70% by weight.

19. The deoxidizing multi-layer structure according to claim 6, wherein the layer (I) has an oxygen permeability of 1000 cc/m$^2$.atm.day; the layer (I) comprises at least one thermoplastic resin selected from the group consisting of polyethylene, polypropylene, polymethylpentene, polyethylene terephthalate, nylon 6 and nylon 66; the layer (I) has a thickness of 10 to 200 μm; and the layer (II) has a thickness of 1000 μm or less.

20. The deoxidizing multi-layer structure according to claim 19, wherein the layer (III) has an oxygen permeability of 50 cc/m$^2$.atm.day measured at 23° C. and a relative humidity of 100%; and the layer (III) comprises a material selected from the group consisting of polyethylene, polypropylene, polymethylpentene, polyethylene terephthalate, nylon 6, nylon 66, MX nylon, polyvinyl chloride, polyvinylidene chloride and aluminum foil.

21. The deoxidizing multi-layer structure according to claim 6, wherein the metallic powder is iron powder, and the metal halide is in an amount of 0.1 to 10 parts by weight with respect of 100 parts by weight of the metallic powder; (A) has a hardness 95 or less; and (A) is contained in an amount in the thermoplastic resin mixture of 10 to 80% by weight.

* * * * *